(12) United States Patent
Phatak et al.

(10) Patent No.: US 9,075,939 B2
(45) Date of Patent: Jul. 7, 2015

(54) METHOD FOR CO-SIMULATION OF TWO OR MORE MATHEMATICAL MODELS

(75) Inventors: Sujit Phatak, Farmington Hills, MI (US); Donald J. McCune, Farmington Hills, MI (US)

(73) Assignee: Hitachi, Ltd, Tokyo (JP)

( * ) Notice: Subject to any disclaimer, the term of this patent is extended or adjusted under 35 U.S.C. 154(b) by 485 days.

(21) Appl. No.: 13/495,105

(22) Filed: Jun. 13, 2012

(65) Prior Publication Data

US 2013/0338975 A1    Dec. 19, 2013

(51) Int. Cl.
| | |
|---|---|
| *G06F 17/10* | (2006.01) |
| *G06G 7/48* | (2006.01) |
| *G06F 17/50* | (2006.01) |
| *F02D 41/26* | (2006.01) |
| *F02D 41/14* | (2006.01) |

(52) U.S. Cl.
CPC ........ *G06F 17/5009* (2013.01); *G06F 17/5095* (2013.01); *G06F 17/5086* (2013.01); *F02D 41/263* (2013.01); *F02D 41/266* (2013.01); *F02D 2041/1423* (2013.01)

(58) Field of Classification Search
CPC . G06F 17/50; G06F 17/5022; G06F 17/5086; G06F 17/5095; G06F 17/5009; G06F 2217/04; G06F 2217/86; F02D 41/263; F02D 2014/1423; F02D 41/266
USPC .......................................................... 703/8
See application file for complete search history.

(56) References Cited

U.S. PATENT DOCUMENTS

| | | | | |
|---|---|---|---|---|
| 5,907,695 | A * | 5/1999 | Dearth ........................... | 703/17 |
| 6,389,375 | B1 * | 5/2002 | Thomsen et al. ................. | 703/2 |
| 6,425,762 | B1 * | 7/2002 | Ernst ............................... | 434/29 |
| 6,937,257 | B1 * | 8/2005 | Dunlavey ....................... | 715/763 |
| 7,319,947 | B1 * | 1/2008 | Khaira et al. ................... | 703/17 |
| 2006/0161410 | A1 * | 7/2006 | Hamatani et al. .............. | 703/13 |

OTHER PUBLICATIONS

Phatak et al, "Cyber Physical System: A Virtual CPU Based Mechatronic Simulation", 5th IFAC Symposium on Mechatronic Systems, Sep. 13-15, 2010.*
Chizeck et al, "Error Detection and Unit Conversion: Automated Unit Balancing in Modeling Interface System", IEEE Eng. Med. Biol. Mag. 28(3): 50-58, 2009.*
Ostermann et al, "Dynamic Cloud Provisioning for Scientific Grid Workflows", 11th IEEE/ACM International Conference on Grid Computing, 2010.*

(Continued)

*Primary Examiner* — Mary C Jacob
(74) *Attorney, Agent, or Firm* — Gifford, Krass, Sprinkle, Anderson & Citkowski, P.C.

(57) ABSTRACT

A method for the co-simulation of two or more interacting mathematical models in which each model has at least one input port and one output port for inputting and outputting values of parameters in a predefined parameter protocol. The unit of measurement is identified for each parameter in the model and a scaling factor is then generated to equalize the units of measurement for each parameter in each model. The parameter protocol for each port is then determined and a virtual bus with unique locations is configured for each parameter in the models. The parameters from the models are then configured as a function of the parameter protocol so that the same parameters from different models are associated with the same location in the virtual bus.

8 Claims, 3 Drawing Sheets

(56) References Cited

OTHER PUBLICATIONS

He et al, "An Efficient and Secure Cloud-Based Distributed Simulation System", Applied Mathematics & Information Sciences, 6, No. 3, pp. 729-736, Accepted May 5, 2012, published online Aug. 1, 2012.*

McCune et al, "CPU Model-Based Hardware/Software Co-design, Co-Simulation and Analysis Technology for Real-Time Embedded Control Systems", Proceedings of the 13th IEEE Real Time and Embedded Technology and Applications Symposium, 2007.*

Osborne, R., "Concurrent WAVE/Matlab Simulink Simulation Applied to HSDI Diesel ECU Calibration", Proceedings of the Fourth Ricardo Software Internal User Conference, Detroit, Michigan, 1999.*

McManus et al, "Co-Simulation: Developing a Virtual Vehicle Modeling Capability", SAE Technical Paper 2001-01-0038, SAE 2001 World Congress, Mar. 5-8, 2001.*

\* cited by examiner

METHOD FOR CO-SIMULATION OF TWO OR MORE MATHEMATICAL MODELS

BACKGROUND OF THE INVENTION

I. Field of the Invention

The present invention relates to a method for the co-simulation of two or more mathematical models.

II. Description of Related Art

In the automotive industry, it is necessary to validate and calibrate the electronic control unit (ECU) for the vehicle which controls the overall operation of the major vehicle components. Traditionally, the approach for the calibration testing involves considerable real hardware and software systems that must work together in the final vehicle.

The basic purpose of calibration of an engine is to fine tune and optimize the operation of the engine for high performance, efficiency, fuel economy, low emissions, etc. This process is typically conducted in a laboratory environment before the installation of the engine in the vehicle for the final vehicle testing.

In a laboratory environment, the engine is mechanically coupled to a dynamometer which is a high performance electric motor that is mechanically coupled with the engine shaft. The dynamometer is able to run the engine in either of two operating modes, namely motoring and loading. In the motoring mode, the dynamometer is used to rotatably drive the engine so that the engine produces a theoretical negative torque for the dynamometer. After the vehicle has warmed up after running in the motoring mode for a period of time, the engine is switched on so that the engine rotatably drives the dynamometer shaft. In doing so, the dynamometer acts as an engine load.

In the loading mode, the load of the engine can be varied by controlling the speed of the dynamometer using the control system for the dynamometer. In doing so, technicians are able to simulate real world scenarios for the engine in terms of loading. These different scenarios include, for example, operating the engine under different road incline and speed conditions.

The calibration of the overall control for the engine consists generally of two separate parts. The first part includes the calibration software which runs on a separate computer, typically a PC, while the second part consists of the built in or dedicated hardware which interfaces the personal computer with the engine ECU. During this calibration phase, the software of the ECU can be modified as desired or required in order to achieve the desired engine operation.

One disadvantage of the previously known method for calibrating the ECU in an automotive vehicle is that the calibration system necessarily requires the use of real hardware when operating the engine with the dynamometer. Unless the real hardware is completed, ready, tested, and available, it has not been previously possible to carry out the calibration process. This, in turn, can undesirably extend the required time for the overall engine development.

SUMMARY OF THE PRESENT INVENTION

The present invention provides a method which overcomes the above mentioned disadvantages of the previously known calibration methods and which, by doing so, decreases the overall design time to both design and calibrate the engine system.

In brief, the present invention provides a method executed by a processor for the co-simulation of at least two interacting mathematical models wherein each model represents a component of the overall engine system. Each model includes at least one input port and at least one output port which input and output values, respectively, in predetermined units of measurement for particular parameters of the model. Typically, the model parameters are inputted and outputted in a serial fashion in a predefined protocol.

The first step of the co-simulation method of the present invention is to access a plurality of computers through a communication network in order to locate mathematical models which correspond to the components for which the co-simulation is desired. Oftentimes, these mathematical models for components of the overall system are contained on different computers. Consequently, in the preferred embodiment of the invention, the method of the present invention accesses the different computers through a communication network, such as a LAN or the Internet, to locate not only the models for the co-simulation, but also the availability of that particular model at a given time. The computers containing the models may be either directly addressed, or contained in cloud computing.

After the models for the co-simulation have been located, the method then identifies the unit of measurement for each parameter in each mathematical model. These parameters for each mathematical model vary depending upon the particular component that the model simulates. For example, one parameter of the model could contain a value representative of the rpm of the engine, another parameter may correspond to a value for the parameter of the intake vacuum pressure, engine temperature, etc. A unit of measurement is also associated with each parameter.

The method then generates scaling factors for each parameter in each model to equalize the units of measurement for a particular parameter for all of the models that utilize that parameter. For example, if one of the parameters represents engine temperature and one model uses Fahrenheit as a temperature scale while a second model utilizes Centigrade as the unit of measurement, the method of the present invention generates the scaling factor to equalize these two parameters from the two models into a common unit of measurement.

The method then determines the parameter protocol, i.e. order of the parameters inputted and outputted, for each model. This parameter protocol not only identifies all of the various parameters inputted and outputted by a given model, but also the order or sequence in which the parameters are inputted and outputted for each model.

The method of the present invention then uses a virtual bus with unique locations for each parameter inputted or outputted by each model. The method then configures the parameter protocol from the models so that the same parameter for each model is associated with the same location, i.e. memory location, in the virtual bus.

After all of the mathematical models involved in the co-simulation have been properly configured to the virtual bus and properly scaled so that equal units of measurement are used for all of the models, the execution or co-simulation of the models yields an accurate simulation of the overall operation of the engine. Since the simulation can occur before real hardware is available, the overall development time for the engine system may be significantly reduced.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
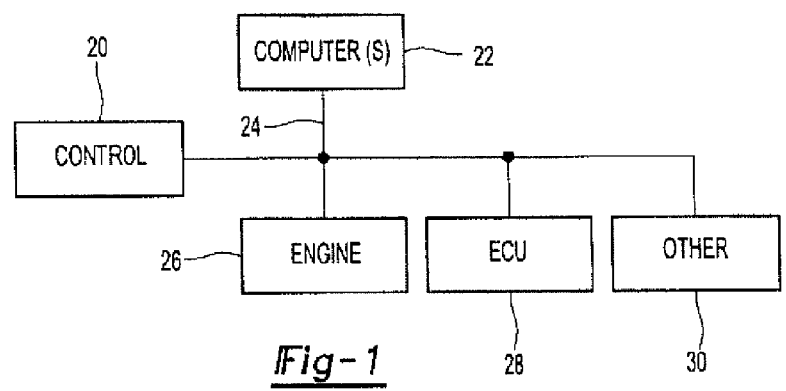
FIG. 1 is a diagrammatic view of a system to carry out the method of the present invention.

With reference first to FIG. 1, a diagrammatic view of the overall system to implement the method of the present invention is illustrated. The system includes a control unit 20, such as a personal computer (PC) having an internal program processor which executes a program under software control. The control unit 20, under operation of the person or persons conducting the co-simulation, communicates with one or more computers 22 through a communication network 24, such as a LAN or the Internet. The computers 22 may operate under a cloud computing arrangement where the computers 22 are a collection of high performance computers. These computers 22, furthermore, contain mathematical models for the various components of the automotive engine system. These mathematical models, which may be contained on one or multiple computers, include, for example, an engine model 26, an engine control unit (ECU) model 28, as well as other mechanical or electronic components 30 of the overall automotive engine system.

Figure 2:
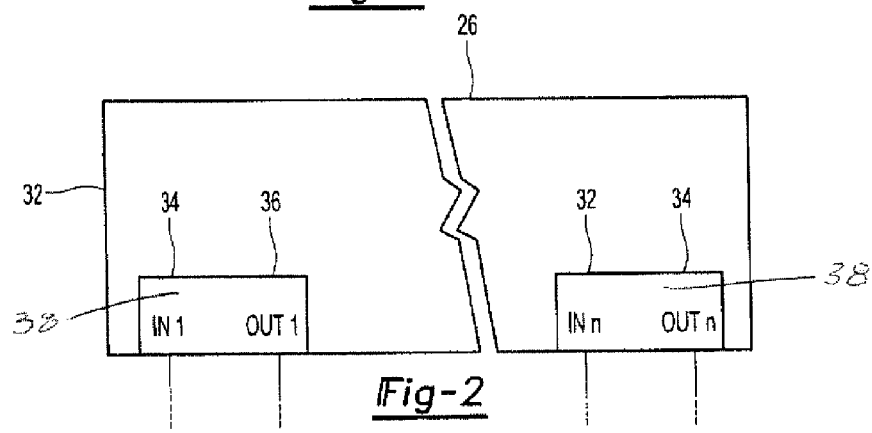
FIG. 2 is a diagrammatic view of an exemplary model.

With reference now to FIG. 2, one of the models 26 is shown. The model 26 includes an input port 34 and an output port 36. At least one, and more typically several, parameters 38 are also associated with each model 26 and these parameters 38 communicate serially through the ports 32 and 34 in a predetermined order or protocol. For example, one parameter 38 of the engine model 26 might correspond to the rpm of the engine shaft, another parameter 38 correspond to the engine temperature, and so forth. Each parameter, furthermore, will have its own unit of measurement. For example, if one of the parameters represents a pressure, pressure can be represented in many different units of measurement such as Pascal, atmosphere, torr, psi, etc. Furthermore, the unit of measurement for the pressure of one mathematical model 26 may differ dramatically from the other models 28 and 30.

Figure 3:
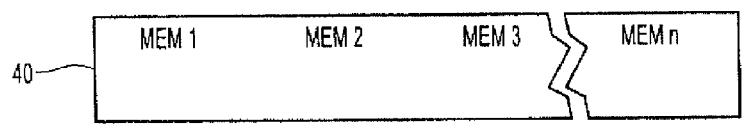
FIG. 3 is a diagrammatic view of a virtual bus.

With reference now to FIG. 3, in order to enable the different models 26, 28 and 30 to communicate with each other, the method of the present invention either creates or communicates with a virtual bus 40. The virtual bus 40 includes a plurality of memory locations or ports, such as MEM1, MEM2, MEM3, . . . MEMN. Each memory location MEM corresponds to an engine operating parameter. For example, MEM1 may contain a value representative of the engine rpm while MEM2 contain a value representative of the engine operating temperature. Similarly, MEM3 could contain a value representative of the engine intake manifold pressure, and so on.

Figure 4:
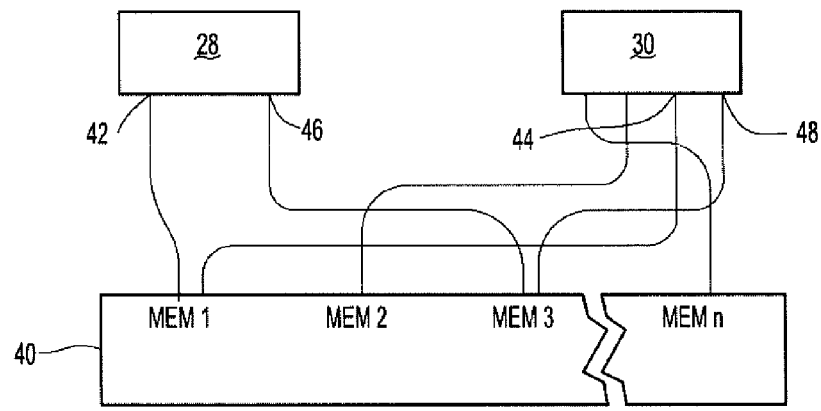
FIG. 4 is a diagrammatic view of the step of configuring the virtual bus.

With reference now to FIG. 4, the parameter protocol or order of the serial data of the parameters for each model, such as models 28 and 30, often vary between the different models. For example, the first parameter 42 in the model 28 may correspond to one engine parameter, such as engine temperature, while the third parameter 44 in the model 30 may correspond to the engine temperature. Similarly, MEM3 in the virtual bus 40 may correspond to engine rpm. Similarly, the second parameter 46 of the model 28 may correspond to engine rpm, while the fourth parameter in the model 30 may correspond to the engine rpm, and so on.

Consequently, in order to ensure that the parameters on the models 28 and 30, as well as all the models in the co-simulation, are properly interconnected, it is necessary to configure the parameters on all of the models 28, 30 in the co-simulation so that the same parameter references are configured to the same memory location or port in the virtual bus 40. In this fashion, the same parameters represented by the memory locations MEM1-MEMN in the virtual bus 40 will be connected or configured to the same parameter on the models 28 and 30 regardless of the parameter protocol for each of the models 28 and 30.

Figure 5:
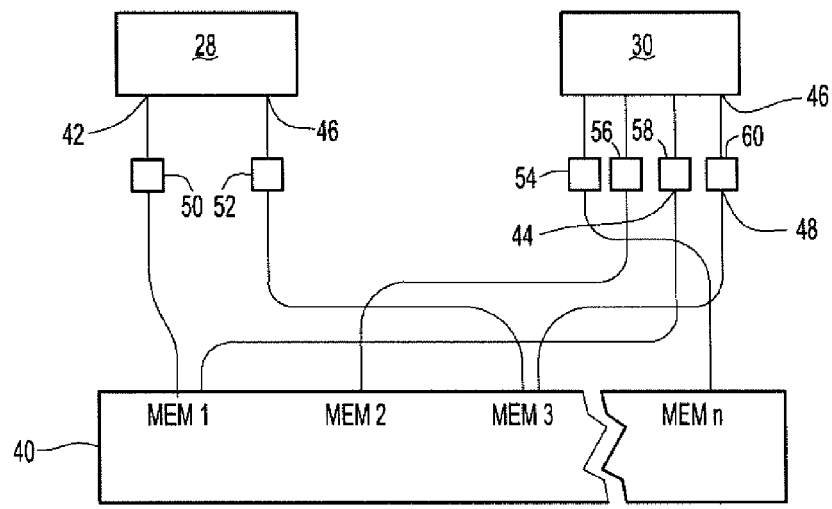
FIG. 5 is a diagrammatic view of the step of the configured virtual bus with scaling factors.

With reference now to FIG. 5, the operation of the method of the present invention will now be described. As previously discussed, different units of measurements may be used to measure the same engine parameter for the different models 26, 28, 30, etc. Consequently, the value on any one of the parameters for the models 28 and 30 may be completely different in numerical value even for the same engine operating condition. For example, assuming that the memory location MEM1 is associated with the parameter of the engine operating temperature, a value of 1000 for the parameter 38 for the model 28 may correspond to 180° Fahrenheit whereas the value 2350 for the same parameter for the model 30 may also correspond to 180° Fahrenheit.

In order to ensure that all of the models involved in the co-simulation properly communicate equivalent values between each other through the virtual bus 40, the method of the present invention assigns a scaling factor 50, 52, 54, 56, 58 and 60 with each parameter in each model. Consequently, by adjustment of the scaling factors 50-60 for all of the parameters in the various models 28 and 30 involved in the co-simulation, a predetermined unit of measurement for each parameter in each model 28 is obtained. It will be understood, of course, that all of the scaling factors 50-60 are maintained in software by the control processor 20 (FIG. 1).

Figure 6:
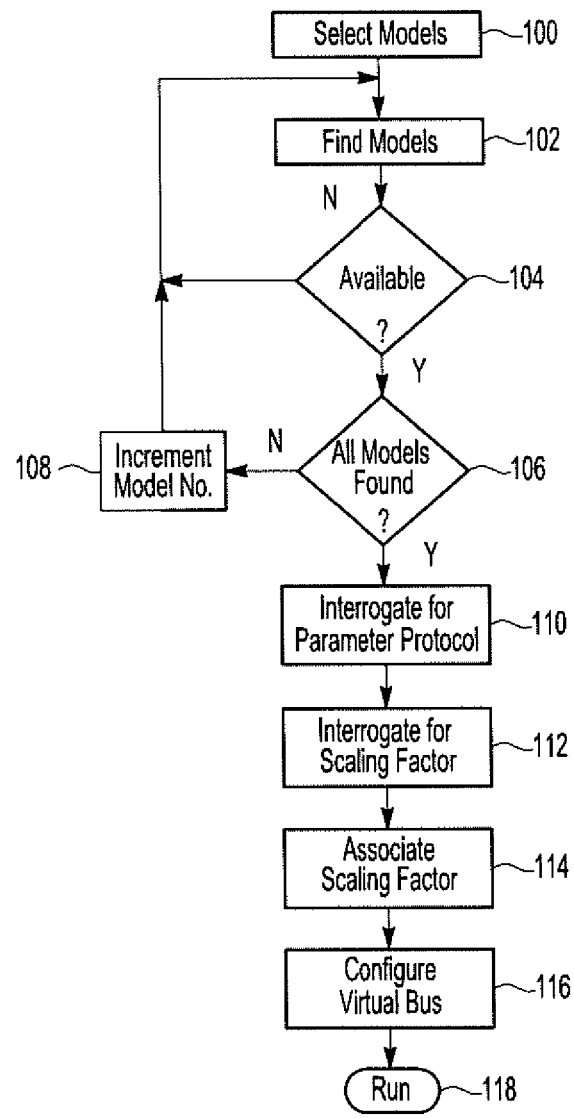
FIG. 6 is a flowchart.

With reference now to FIG. 6, a flowchart illustrating the operation of the method of the present invention is shown. It will be understood that the method illustrated in the flowchart of FIG. 6 is executed in software by a processor contained in the control unit 20. That processor, as previously described, communicates with the other computers 22 which, in turn, contain the various models 26-30 used in the co-simulation. The communication between the control unit 20 and the other computers may be through a LAN, the Internet, or any other conventional communication network.

At step 100, the operator through control of the control unit 20 inputs the various models desired to be used during the co-simulation. There may be as few as two models although in most practical simulations, at least for the automotive industry, more models will be used during most practical simulations. After the operator selects the models, the method proceeds to step 102.

At step 102, under program control of the control unit 20, the control unit 20 communicates with the computer to find the availability of the models inputted at step 100. Step 102 begins with the first model and, when found, continues to step 104. At step 104, the program determines if the found model is available for use during the co-simulation. If not, step 1 branches back to 102 which continues to search for the first model.

Conversely, if the found model is available, step 104 instead branches to step 106 which determines if all of the models inputted at step 100 have been found. If not, step 106 branches to step 108 which sets the proper identification for the next model and step 108 proceeds back to step 102. The loop of steps 102-106 continues until all of the models inputted at step 100 have been found and are all available. Step 106 then branches to step 110. At step 110, the control unit 20 under program control interrogates the models found at steps 102-108 to determine the parameter protocol, i.e. the order of the ports for the various computer models (see FIG. 4) for each of the models. Step 110 then proceeds to step 112.

At step 112, the control unit 20, under program control, interrogates the models found at steps 102-108 for the units of measurement used by each parameter in each model. Step 112 then proceeds to step 114.

At step 114, the control unit 20 associates each scaling factor determined at step 112 with each parameter in each model. As previously discussed, this ensures that output from or input to each of the ports in the models are in the same units of measurement. Step 114 then proceeds to step 116.

At step 116, the control unit 20 under program control configures the virtual bus 40 (FIG. 4) so that the same parameter from each of the models is associated with the same unique memory location in a virtual bus. Step 116 then proceeds to step 118.

At step 118, all of the computer models used during the co-simulation have not only been configured to the virtual bus, but all of the parameters in the models have been properly scaled for proper communication of the correct parameters between the various computer models. Step 118 then executes and runs the co-simulation.

It will be understood that the actual order of execution of the steps 110-116 is not critical. For example, steps 110 and 112 may be executed as a single step or may be executed in reverse order. Similarly, step 110 which integrates the models for the parameter protocol and step 116 where the virtual bus is configured as a function of the parameter protocol may be completed either before or after steps 112 and 114 have been completed which establish the scaling factor for the model parameters. Rather, it is only necessary that the virtual bus not only be configured, but that the ports from the models be scaled to ensure that the correct units of measurement are employed between the different computer models.

From the foregoing, it can be seen that the present invention provides a simple and yet highly effective method for the co-simulation of computer models and which is particularly applicable to an automotive engine. Having described our invention, however, many modifications thereto will become apparent to those skilled in the art to which it pertains without deviation from the spirit of the invention as defined by the scope of the appended claims.

We claim:

1. A method executed by a processor for the co-simulation of at least two interacting mathematical models, each model having at least one input port and one output port which input and output parameter values, respectively, in predetermined units of measurement, the method comprising the steps of:

identifying the unit of measurement for each parameter in each model, generating scaling factors for each said parameter in each model to equalize the units of measurement for each parameter in each model, determining a parameter protocol for each model, the parameter protocol defining the order of serial data of the parameters for each model, configuring a virtual bus having a unique memory location corresponding to each parameter as a function of the parameter protocol from each model so that the same parameter after scaling from each model is associated with the same unique location for said parameter in the virtual bus, and thereafter, running a co-simulation of the mathematical models, wherein during the co-simulation, parameters are communicated between the at least two interacting mathematical models via the unique memory locations on the virtual bus.

2. The method as defined in claim 1 wherein at least one of said models includes a parameter protocol list and wherein said identifying step further comprises a step of the processor interrogating said at least one model for its parameter protocol list and thereafter inputting the parameter protocol list by the processor.

3. The method as defined in claim 1 and further comprising the steps of:

accessing a plurality of computers through communication network, and locating each model in said plurality of computers, wherein said accessing step and said locating step are performed prior to said identifying step.

4. The method as defined in claim 3 and further comprising a step of determining the availability of each model after said locating step.

5. The method as defined in claim 1 wherein each model simulates at least one component in an automotive vehicle.

6. The method as defined in claim 1 wherein at least two different models are executed on at least two separate but interconnected computers during said co-simulation.

7. The method as defined in claim 6 where said at least two computers are interconnected by a communication network.

8. The method as defined in claim 1 wherein the co-simulation is executed by cloud computing.

* * * * *